(No Model.)

L. M. ROBBINS.
VEHICLE POLE OR SHAFTS.

No. 477,269. Patented June 21, 1892.

Witnesses
A. Ruppert.
A. L. Hough.

Inventor
Lorenzo M. Robbins
by Franklin H. Hough
Attorney

UNITED STATES PATENT OFFICE.

LORENZO MARTIN ROBBINS, OF ELIZABETH, ARKANSAS.

VEHICLE POLE OR SHAFT.

SPECIFICATION forming part of Letters Patent No. 477,269, dated June 21, 1892.

Application filed October 15, 1891. Serial No. 408,759. (No model.)

*To all whom it may concern:*

Be it known that I, LORENZO MARTIN ROBBINS, a citizen of the United States, residing at Elizabeth, in the county of Fulton and State of Arkansas, have invented certain new and useful Improvements in Vehicle Poles and Shafts; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in that class of draft attachments for vehicles in which provision is made for employment with either a single or double team, the construction being such that it can be quickly and easily converted into either a pole or shafts, as occasion may require.

It has for its objects, among others, to improve, generally, upon this class of devices and to render them more easily convertible and to make them stronger, more durable, and less liable to get out of order or break. I connect the shafts to the transverse bar of the draft-frame in such a manner that they may be turned thereon as a pivot into either the one or other position. The rear ends of the shafts are provided with bars, which are designed to extend beyond the ends of the shafts and to be connected with the said transverse bar in either of the two positions which the shafts may be caused to assume. The shafts are formed upon their adjacent sides practically flat, so that when used as a pole they abut against each other, the upper faces being rounded, so that when brought together they form, practically, a round pole, the ends being designed to be fitted into a tip. The transverse bar of the draft-frame is provided with shallow channels, in which the bars on the ends of the shafts are designed to travel, so that they may move inside of the links or bars which pivotally connect the shafts with the said bar.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, and in which—

Figure 1:
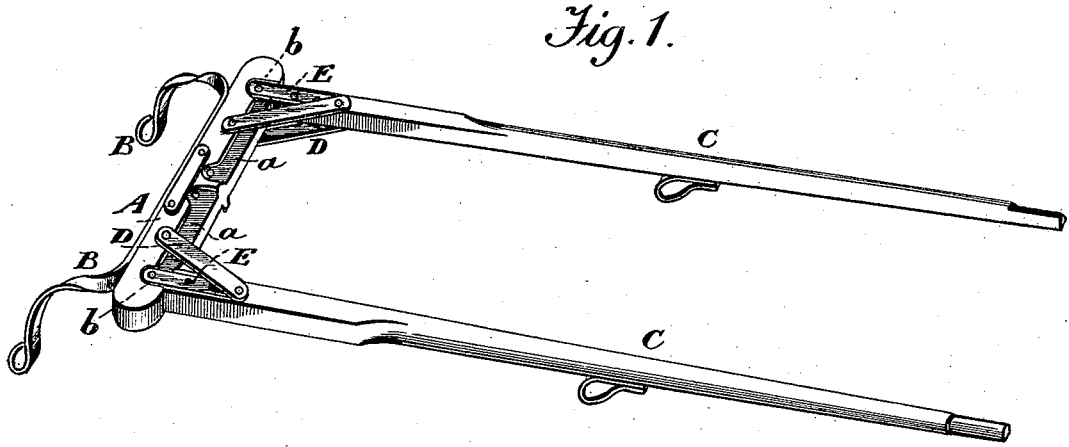
Figure 2:
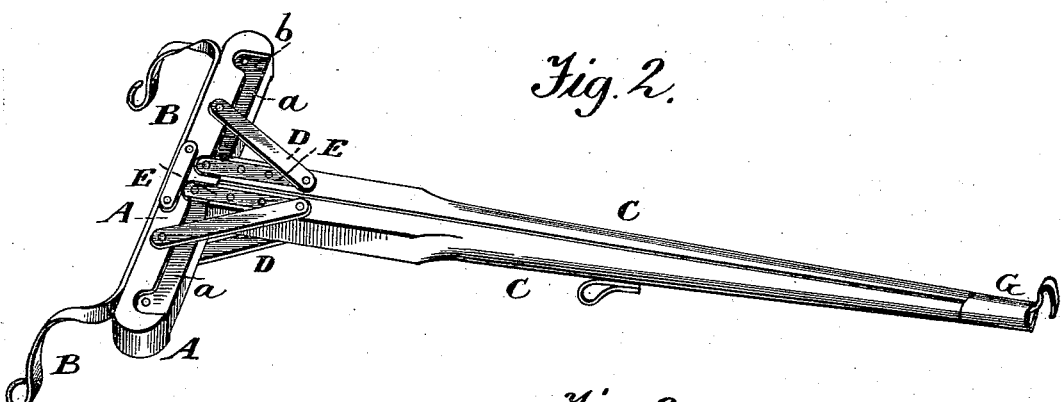
Figure 3:
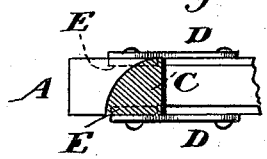

Figure 1 is a perspective view of my improvement shown as arranged for shafts for a single animal. Fig. 2 is a like view with the parts arranged as a pole. Fig. 3 is a cross-section through one of the shafts.

Like letters of reference indicate like parts throughout the several views in which they occur.

Referring now to the the details of the drawings by letter, A designates the transverse bar of the draft-frame, to the rear face of which is attached in any suitable manner the draft-bar B, which extends across the said bar and has its ends turned at right angles thereto, being provided with a twist, as shown, to add strength and to fit them for attachment. The upper and lower faces of the said transverse bar are provided with longitudinal channels or depressions $a$ for the movement of the bars, which are attached to the rear ends of the shafts, as will more fully hereinafter appear. The ends of these channels terminate in enlargements $b$ for the reception of the ends of the said bars when they are in either of their positions.

C are the shafts, each of the peculiar cross-section shown in Fig. 3—that is, with their adjacent faces flat and their upper and outer sides rounded—so that when brought together, as shown in Fig. 2, they form a complete round pole, as seen in said Fig. 2.

D are bars or links pivotally connected to the shafts near their rear ends and to the said transverse bar, as seen best in Fig. 1, the said bars or links being arranged in vertical planes upon both the top and bottom sides of the shafts and bar, so as to provide great strength.

E are bars seated in recesses or channels in the rear ends of the shafts upon the upper and under sides thereof with their outer faces substantially flush with the shafts, and the rear ends of these bars are designed to be detachably connected in any suitable manner with the transverse bar A.

The operation will be readily understood. The shafts are moved into the position desired and there secured. As the shafts are moved from the one position to the other the bars E move in the channels of the bar, and when in their fixed positions the rear ends of the said bars are seated in the enlargements of the said channels, as shown. This permits the two sets of bars to pass each other and permits me to employ bars upon the upper and under sides of the shafts in the same vertical planes, thus providing great strength and less liability to breakage.

When arranged for a pole, the outer ends of the shafts are designed to receive a tip G of any suitable construction.

What I claim as new is—

The combination, with the recessed transverse bar, of the shafts, the bars pivotally connecting the same with the said bar, and the bars seated in recesses in the shafts and arranged to work in the recesses of the said bar, as set forth.

In testimony whereof I affix my signature in presence of two witnesses.

LORENZO MARTIN ROBBINS.

Witnesses:
J. W. CARROLL,
WM. R. HIRRER.